United States Patent
Zhao et al.

(10) Patent No.: US 7,496,512 B2
(45) Date of Patent: Feb. 24, 2009

(54) REFINING OF SEGMENTAL BOUNDARIES IN SPEECH WAVEFORMS USING CONTEXTUAL-DEPENDENT MODELS

(75) Inventors: Yong Zhao, Beijing (CN); Min Chu, Beijing (CN); Jian-lai Zhou, Beijing (CN); Lijuan Wang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 751 days.

(21) Appl. No.: 10/823,129

(22) Filed: Apr. 13, 2004

(65) Prior Publication Data

US 2005/0228664 A1 Oct. 13, 2005

(51) Int. Cl.
*G10L 17/00* (2006.01)

(52) U.S. Cl. .................... 704/249; 704/243; 704/244; 704/245

(58) Field of Classification Search ............... 704/258, 704/214, 231, 232, 240, 242, 257, 243, 245, 704/244, 249, 254, 256, 256.2, 250
See application file for complete search history.

(56) References Cited

U.S. PATENT DOCUMENTS 6,006,186 A * 12/1999 Chen et al. ................. 704/254
6,275,795 B1 * 8/2001 Tzirkel-Hancock ......... 704/214
7,266,497 B2 * 9/2007 Conkie et al. ............... 704/258

OTHER PUBLICATIONS

Eun-Young Park et al., "Automatic Speech Synthesis Unit Generation with MLP Based Postprocessor Against Auto-Segmented Phoneme Errors", Proc. ICASSP, pp. 2985-2990, 1999.
Abdelatty et al., "An Acoustic-Phonetic Feature-Based System for Automatic Phoneme Recognition in Continuous Speech", IEEE ISCAS, vol. III, pp. 118-121, May 1999.
Toledano et al., "Neural Network Boundary Refining for Automatic Speech Segmentation", Proc. ICASSP, pp. 3438-3441, 2000.
Sethy et al., "Refined Speech Segmentation for Concatenative Speech Synthesis", Proc. ICSLP, pp. 145-148, 2002.
Lee et al., "Context-Adaptive Phone Boundary Refining for a TTS Database", Proc. ICASSP, pp. 252-255, 2003.
Yeon-Jun Kim et al., "Automatic Segmentation Combining an HMM-based Approach and Spectral Boundary Correction", Proc. ICSLP, pp. 145-148, 2002.

* cited by examiner

*Primary Examiner*—Huyen X. Vo
(74) *Attorney, Agent, or Firm*—Steven M. Koehler; Westman, Champlin & Kelly, P.A.

(57) ABSTRACT

A method and apparatus are provided for refining segmental boundaries in speech waveforms. Contextual acoustic feature similarities are used as a basis for clustering adjacent phoneme speech units, where each adjacent pair phoneme speech units include a segmental boundary. A refining model is trained for each cluster and used to refine boundaries of contextual phoneme speech units forming the clusters.

34 Claims, 5 Drawing Sheets

REFINING OF SEGMENTAL BOUNDARIES IN SPEECH WAVEFORMS USING CONTEXTUAL-DEPENDENT MODELS

BACKGROUND OF THE INVENTION

The present invention relates to language processing systems. In particular, the present invention relates concatenative text-to-speech (TTS) systems where speech output is generated by concatenating small stored speech units or segments one by one in series.

Ascertaining segmental boundaries for adjacent speech units used in a corpus-based concatenative TTS system is important in realizing naturalness in generated speech output from such systems. Prior techniques include manually labeling such boundaries. Although this technique is reliable, it is nevertheless very laborious and time consuming, making such a technique impractical to be applied to a large speech corpus.

Accordingly, there has developed a need to provide an automatic speech segmentation approach with comparable accuracy to human experts. Such a system and method would be particularly helpful when speech units are obtained from a large speech corpus. One segmentation method is referred to as "forced alignment" and is widely used in the training stage of HMM based Automatic Speech Recognition (ASR) systems. However, in performing forced alignment, boundary marks are to some extent under-estimated as Viterbi algorithm is targeted to match the wave stream to the whole labeled speech state sequence in a criterion minimizing the global distance. However, boundaries obtained in this manner are often not identical to the best splicing points between speech units. Thus, post-refinement is often performed to search for the most suitable locations for boundaries. The post-refinement technique uses a small amount of manually labeled boundaries for learning the characteristics of human-preferred boundary marks.

Various refining techniques have been used to refine the boundary locations. These techniques include using Gaussian Mixture Models (GMM), Hidden Markov Model (HMM), Neural Networks (NN) and Maximum Likelihood Probabilities (MLPs) to portray the boundary property. Some techniques have included classifying speech units by phonemic context, such as Vowel, Nasals, Liquids etc, where a refining model was trained for each group. However, classification is coarse such that the phonemic context within the same group may vary greatly. For example, /i/ and /u/, which are often clustered into the Vowel group, have quite different formant trajectories. Modeling them with the same refining model causes a loss in precision. An ideal solution is to train an individual model for each pair of speech unit boundaries. However, there are normally not sufficient manually labeled boundaries for training so many individual models.

Although various approaches have been tried to refine segmental boundaries for TTS speech units, none have achieved superior results, and thus improvements are continually needed.

SUMMARY OF THE INVENTION

A method and apparatus are provided for segmenting boundaries in speech waveforms. In one aspect, refining models are generated that are based on training data of known boundary locations. In another aspect, the refining models are used to automatically segment speech waveforms.

Generally, the training data of speech waveforms with known boundary locations is processed to obtain multi-frame acoustic feature pseudo-triphone representations of a plurality of pseudo-triphones in the speech data. Each pseudo-triphone includes a boundary location, a first phoneme speech unit preceding the boundary location and a second phoneme speech unit following the boundary location.

The multi-frame acoustic feature pseudo-triphone representations are clustered as a function of acoustic similarity to provide a plurality of clusters. A refining model is trained for each cluster.

The set of refining models can be used to segment a second set of data of speech waveforms with initial boundary locations of adjacent phoneme speech units contained therein. First, pseudo-triphones are identified in the second set of data along with the corresponding refining models for each of the pseudo-triphones. Using the refining model for each corresponding pseudo-triphone a new boundary location is ascertained that is more accurate than the initial boundary.

DETAILED DESCRIPTION OF ILLUSTRATIVE EMBODIMENTS

The present invention relates to a system and method for refining segmental boundaries of speech units used in concatenative TTS systems. However, prior to discussing the present invention in greater detail, one illustrative environment in which the present invention can be used will be discussed.

Figure 1:
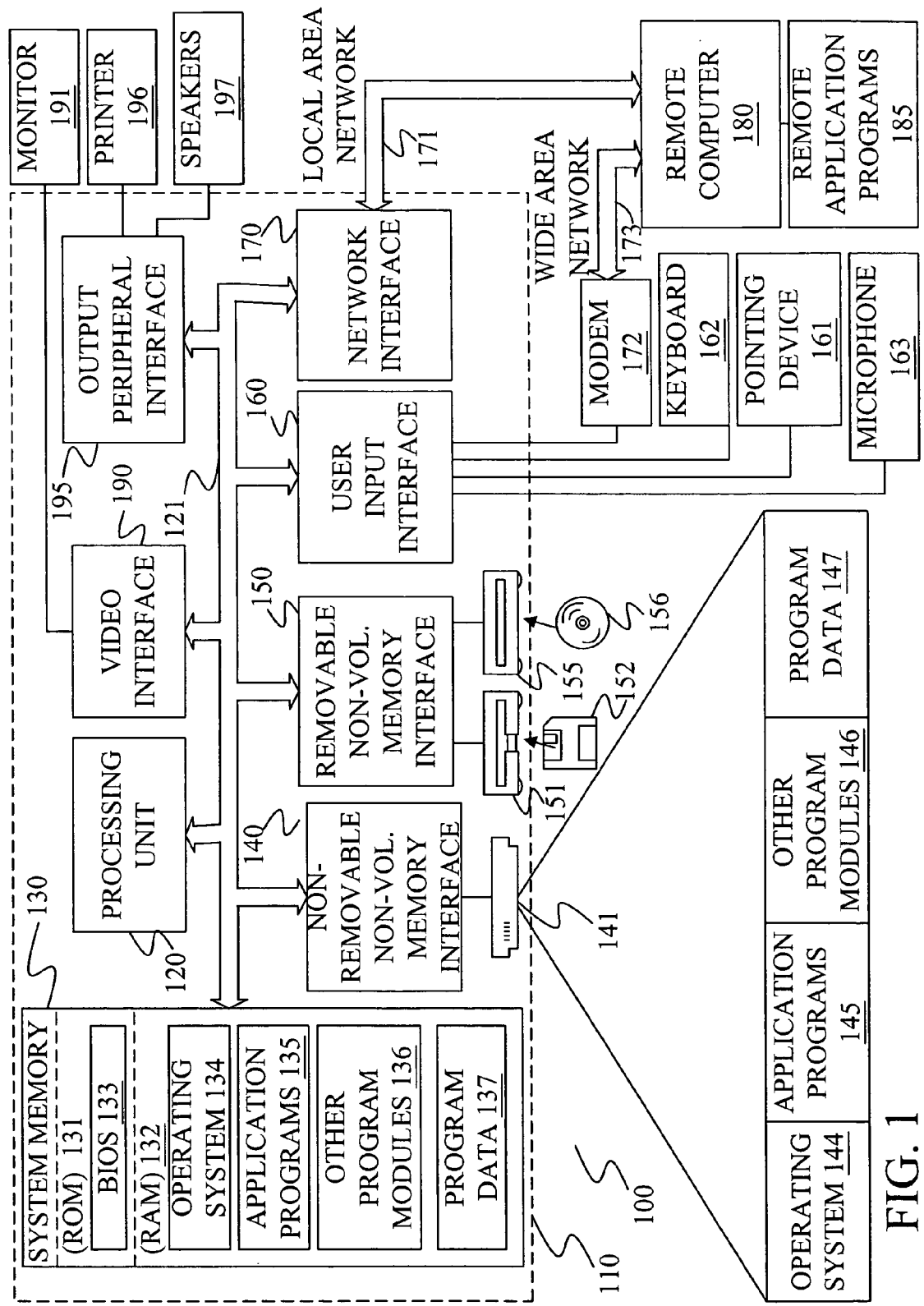
FIG. 1 is a block diagram of a general computing environment in which the present invention may be practiced.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. Those skilled in the art can implement the description and/or figures herein as computer-executable instructions, which can be embodied on any form of computer readable media discussed below.

The invention may also be practiced in distributed computing environments where tasks are performed by remote processing devices that are linked through a communications network. In a distributed computing environment, program modules may be located in both locale and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a locale bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) locale bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 100. Communication media typically embodies computer readable instructions, data structures, program modules or other data in a modulated data signal such as a carrier WAV or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, FR, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way o example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a locale area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

It should be noted that the present invention can be carried out on a computer system such as that described with respect to FIG. 1. However, the present invention can be carried out on a server, a computer devoted to message handling, or on a distributed system in which different portions of the present invention are carried out on different parts of the distributed computing system.

As indicated above, the present invention relates to a system and method for refining segmental boundaries of phoneme speech units used in concatenative TTS systems. In general, contextual acoustic feature similarities are used as a basis for clustering adjacent phoneme speech units based on phoneme context, where each adjacent pair of phoneme speech units include a segmental boundary. A refining model is then trained for each cluster and used to refine boundaries of contextual phoneme speech units forming the clusters.

Before describing the refinement technique in detail, a brief description of segmental boundaries and the contextual-dependent boundary model used herein may be helpful. The change in the speech waveform across a segmental boundary is determined by the phoneme speech units on the left and right sides of the boundary. As used herein, a boundary can be represented by a "pseudo-triphone" in the form of X-B-Y, where B represents a boundary, X represents the phoneme speech unit to the left of the boundary, and Y represents the phoneme speech unit to the right of it. Here "triphone" should not be considered restrictive or limiting as pertaining to only context dependent phonemes, but rather "pseudo-triphone" is used as a means for describing the context existing about the boundary, where the phoneme speech unit includes phones or phonemes, but is not limited thereto. In particular, the phoneme speech unit can be more complex than a single phoneme. For example, the dependent contextual model of a pseudo-triphone can be applied to syllables such as used in Chinese or other languages. For instance, the pseudo-triphone for the segmental boundary between syllable /tian/ and /qi/ in Chinese is /n-B-q/.

Theoretically, there are NX*NY possible such pseudo-triphones, where NX is the number of all possible phoneme speech units X, while NY is the number of all possible phoneme speech units Y, given a particular language and the complexity of the phoneme speech unit being used in forming the phoneme speech unit database of the concatenative TTS system. NX and NY are not necessarily the same. However not all of them appear in the speech corpus to be labeled.

Figure 2:
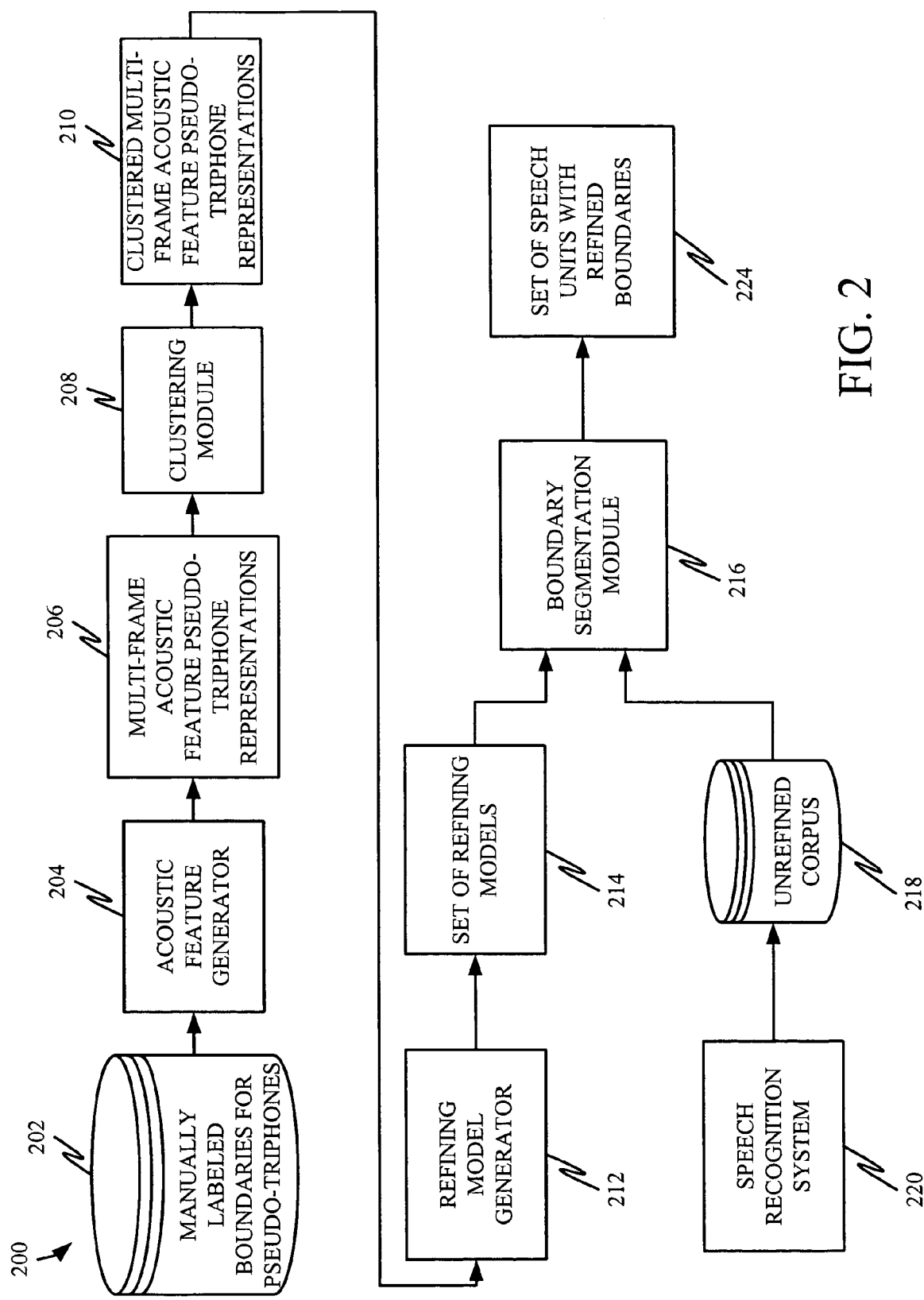
FIG. 2 is a block diagram for a system for creating a set of refining models and use thereof in an automatic boundary segmentation system.
Figure 3:
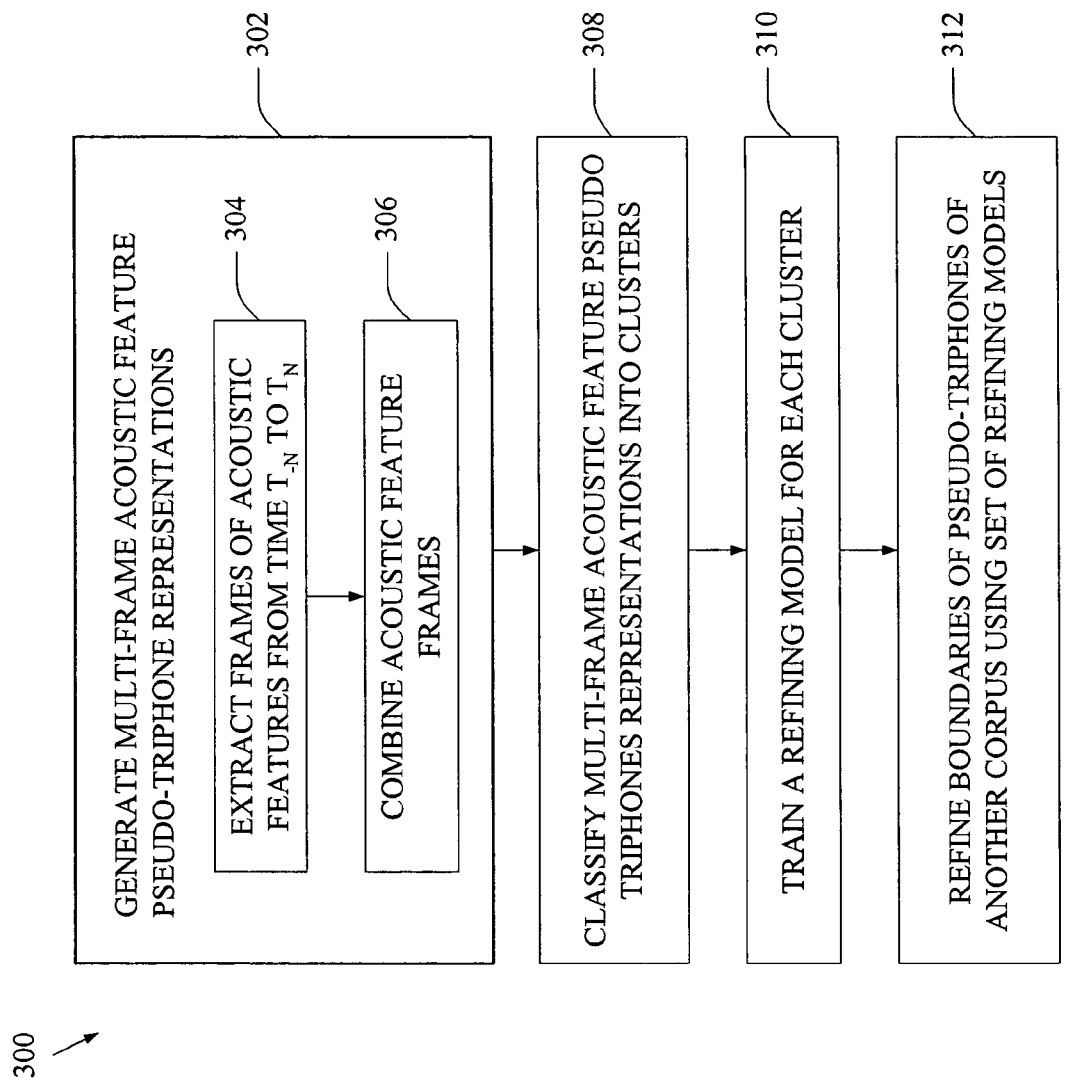
FIG. 3 is a flow diagram of a method of creating a set of refining models.

FIG. 2 illustrates in block diagram form a system 200 for obtaining a set of segmental boundary refining models adapted for use in obtaining boundary locations automatically from a large corpus. FIG. 3 illustrates a method 300 for obtaining the set of boundary refining models. Store 202 schematically illustrates a training corpus comprising acoustic speech waveforms with corresponding phoneme speech unit segmental boundaries that are known to be accurate. Commonly, such boundaries are obtained by manually labeling the boundary location with respect to the speech waveform.

Acoustic feature generator 204 receives speech waveforms and the corresponding labeled boundaries and generates multi-frame acoustic feature pseudo-triphone representations 206 for each of the pseudo-triphones comprising the speech waveforms, which is indicated generally at step 302 in FIG. 3.

Figure 4:
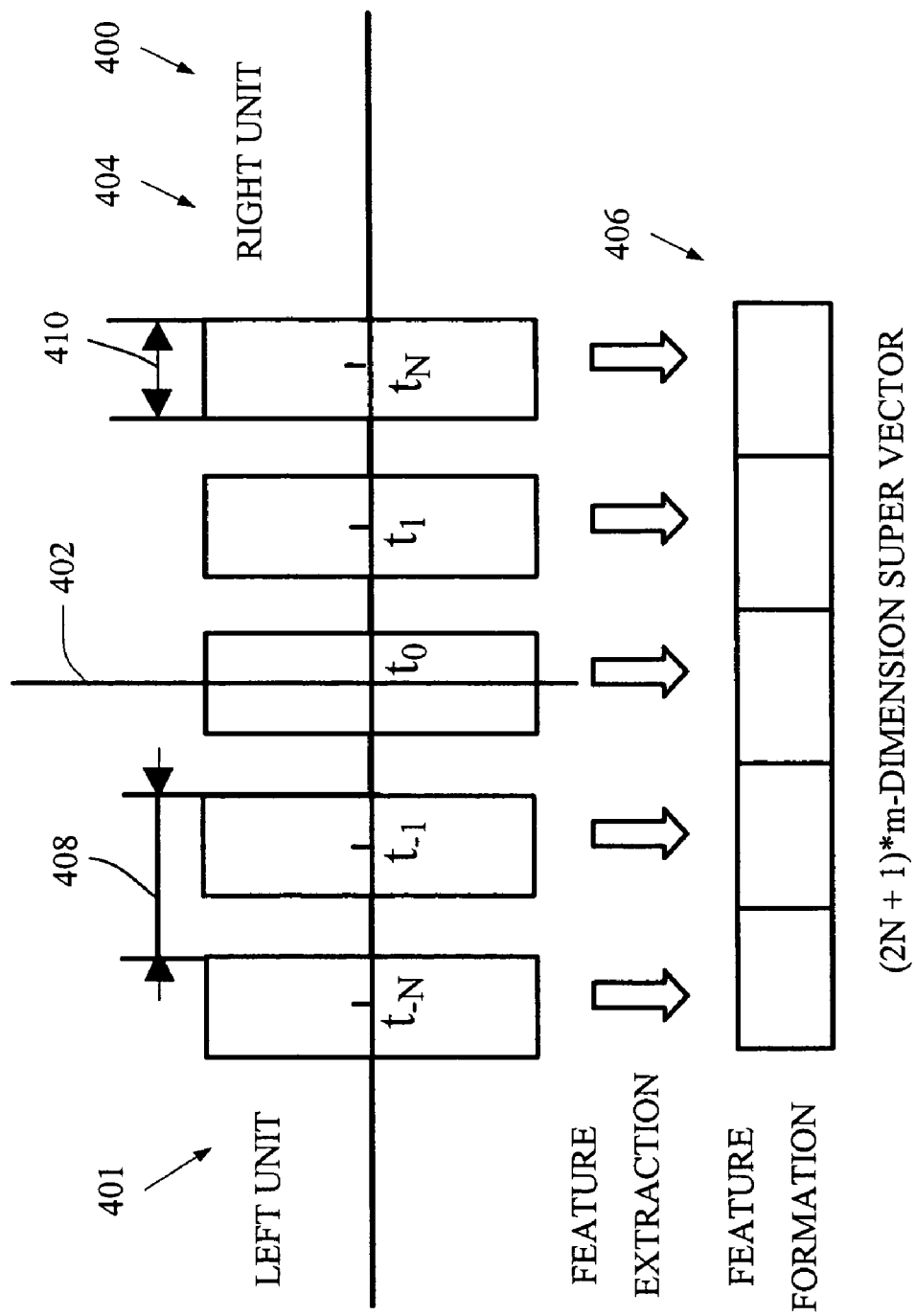
FIG. 4 is a pictorial representation of a speech waveform and acoustic features extracted therefrom.

FIG. 4 schematically illustrates a pseudo-triphone waveform 400 having a left phoneme speech unit 401, a boundary 402 and a right phoneme speech unit 404. A corresponding multi-frame acoustic feature pseudo triphone representation 406 for waveform 400 can be represented by 2N+1 frames of acoustic features, m-dimension each, which are extracted from time $t_{-N}$ to $t_N$, where $t_0$ is the location of the boundary 402, $t_{-N}$ to $t_{-1}$ are N frames to the left of the boundary and $t_1$ to $t_N$ are N frames to the right of the boundary. Extraction of the acoustic features is illustrated at 304 in step 302. In one embodiment as illustrated in FIG. 4, a frame step 408 is set to be larger than a frame size 410 so that consecutive frames are not overlapped and the corresponding multi-frame acoustic feature pseudo triphone representation 406 contains more information about the boundary 402. In another embodiment, having the frame size 410 be larger than the frame step 408 so that consecutive frame overlap exists can provide improved results. An example of frame overlap can be 5 milliseconds.

After extraction, the acoustic features are combined at step 306. The 2N+1 frames acoustic features can form a (2N+1)*m dimension matrix or can be put together to form a (2N+1)*m-dimension super vector 406 (herein illustrated) for that boundary 402. The acoustic features can be any of the widely used features such as MFCCs (Mel Frequency Cepstral Coefficients), LPCs (Linear Prediction Coefficients), LSPs (Line Spectral Pair)/LSF (Line Spectral Frequencies), etc. In one exemplary implementation, 5 frames of 39-dimension vectors (13-dimension MFCCs, 13-deimension ΔMFCCs and 13 dimension ΔΔMFCCs) are used. The frame size is 25 ms and the frame step is 30 ms. The 5 frames of acoustic vectors form a 195-dimension super vector to represent the corresponding boundary 402. Principal Component Analysis (PCA), Independent Component Analysis (ICA) or Linear Discriminant Analysis (LDA) approaches can be used to reduce the dimensions of the multi-frame acoustic feature pseudo triphone representation 406, if desired. A set of multi-frame acoustic feature pseudo triphone representations provided by acoustic feature generator 204 is indicated at 206 in FIG. 2.

For modeling each type of boundaries precisely, training a refining model for each type of pseudo-triphone is desired. However, since there are normally limited manually labeled data available for training, it is not realistic to train a reliable model for each and every pseudo-triphone. Therefore, a clustering module 208 receives the set of multi-frame acoustic feature pseudo triphone representations 206 to classify and thereby provide a set of clustered, or categorized, multi-frame acoustic feature pseudo triphone representations 210, each cluster typically comprising a plurality of multi-frame acoustic feature pseudo triphone representations. Clustering is indicated at step 308 in FIG. 3. In one embodiment, a Classification and Regression Tree (CART) is used to cluster similar multi-frame acoustic feature pseudo triphone representations into the same category or cluster. Those unseen multi-frame acoustic feature pseudo triphone representations can be mapped to a suitable leaf node or cluster as well.

Since the segmental boundaries are treated as a pseudo-triphone, the model clustering procedure is the same as what is done in training acoustic models for phoneme speech units. In fact, the same question set can be used as well.

As appreciated by those skilled in the art, use of a Classification and Regression Tree is one form of clustering technique that can be used. Other clustering techniques by way of example and not limitation include Support Vector Machine (SVM), Neural network (NN), or Vector Quantization (VQ).

By using CART or other clustering techniques, it becomes possible to control the number of nodes (clusters) created, for example, according to the amount of training data available, for instance, by setting a threshold for the Minimum Training Instances (MTI) per leaf node or cluster greater than one. Experiments were conducted for a training set with 5,000 pseudo-triphone instances and 20,000 pseudo-triphone instances respectively. Through adjusting the MTI per leaf node, CARTs of different scales were obtained. As the MTI decreases, the number of leaf nodes on the CART (also the number of refining models discussed below) increases. It was found that, when training with the 20,000 set, the accuracy of the refinement drops if the MTI is set to values larger than 40 and the accuracy is almost unchanged for all other settings. However, when the train set is reduced to 5,000 samples, the accuracy of refinement increases as the MTI decreases until it reaches 10. This implies that the accuracy of refinement will increase when more contextual-dependent models are used as long as a minimum number of instances for training a reliable GMM are used.

In addition, the more training data available, the more leaf nodes (clusters) are formed and the more precise models are obtained. In one experiment, the MTI is set to 10 and it was found that as the size of training set exceeds 5,000, the rate of performance improvement starts to slow down. Of course, more training data is still helpful. However, in the experiment, the curve becomes saturated after the train set reaches 30,000. Therefore, it appears at least 5,000 correct boundaries (approximately 250 utterances) are recommended for training the refining models. However, the approach also works when not much training data is available.

Having obtained the set of multi-frame acoustic feature pseudo triphone representations 210, a refining model is trained for each leaf node or cluster by refining model generator 212 at step 310, which provides a set of refining boundary models 214. Each refining model is then used for refining the boundaries of the pseudo-triphones belonging to that leaf node or cluster at step 312 for another corpus.

A cluster of boundaries (pseudo-triphones) can be modeled by Hidden Markov Model (HMM), Neural Networks (NN) or MLPs. In the exemplary implementation, a Gaussian Mixture Model (GMM) is used to model the most likely locations of boundaries for each cluster. The number of mixtures is adjustable. Although a plurality of Gaussians can be used, in one embodiment, using only one Gaussian provided the best results. This might be because that the transitions at boundaries in each cluster are similar to each other so that one Gaussian is good enough to model the distribution of the features. In some instances, increasing the number of mixtures may have a detrimental effect on boundary accuracy. The reason for this may be that, when the number of instances on some leaf nodes is small, the parameters of multiple Gaussian mixtures cannot be estimated reliably.

Once the training is completed, automatic refinement of all boundaries in a large or simply another corpus can start. In FIG. 2, automatic boundary segmentation is performed by boundary segmenting module 216, which receives as an input the set of refining modules 214 and a corpus or store 218 of acoustic speech waveforms with corresponding phoneme speech unit segmental boundaries that will be refined. In one embodiment, corpus 218 can be obtained from a speech recognition system 220 operated to perform forced alignment over the corpus 218. Typically, such systems have not been found to be very accurate in ascertaining phoneme speech unit boundaries; however by using the set of refining models 214 accuracy has been significantly improved without manual intervention.

Generally, for a specific boundary to be refined, the optimal location of boundary is assumed to be in the vicinity of the initial boundary, i.e. a more suitable boundary is to be searched in a certain range around the initial one (that obtained by the forced alignment or any other methods). Normally, a small frame step is used in the refining stage in order to get precise locations of boundaries. The smaller the frame step is, the more precise the optimal boundary will be, however, at the cost of more calculations. In one exemplary implementation, a step of 1 millisecond (ms) is used and the search range is from 70 ms to the left of the initial boundary to 70 ms to the right of the initial boundary.

Figure 5:
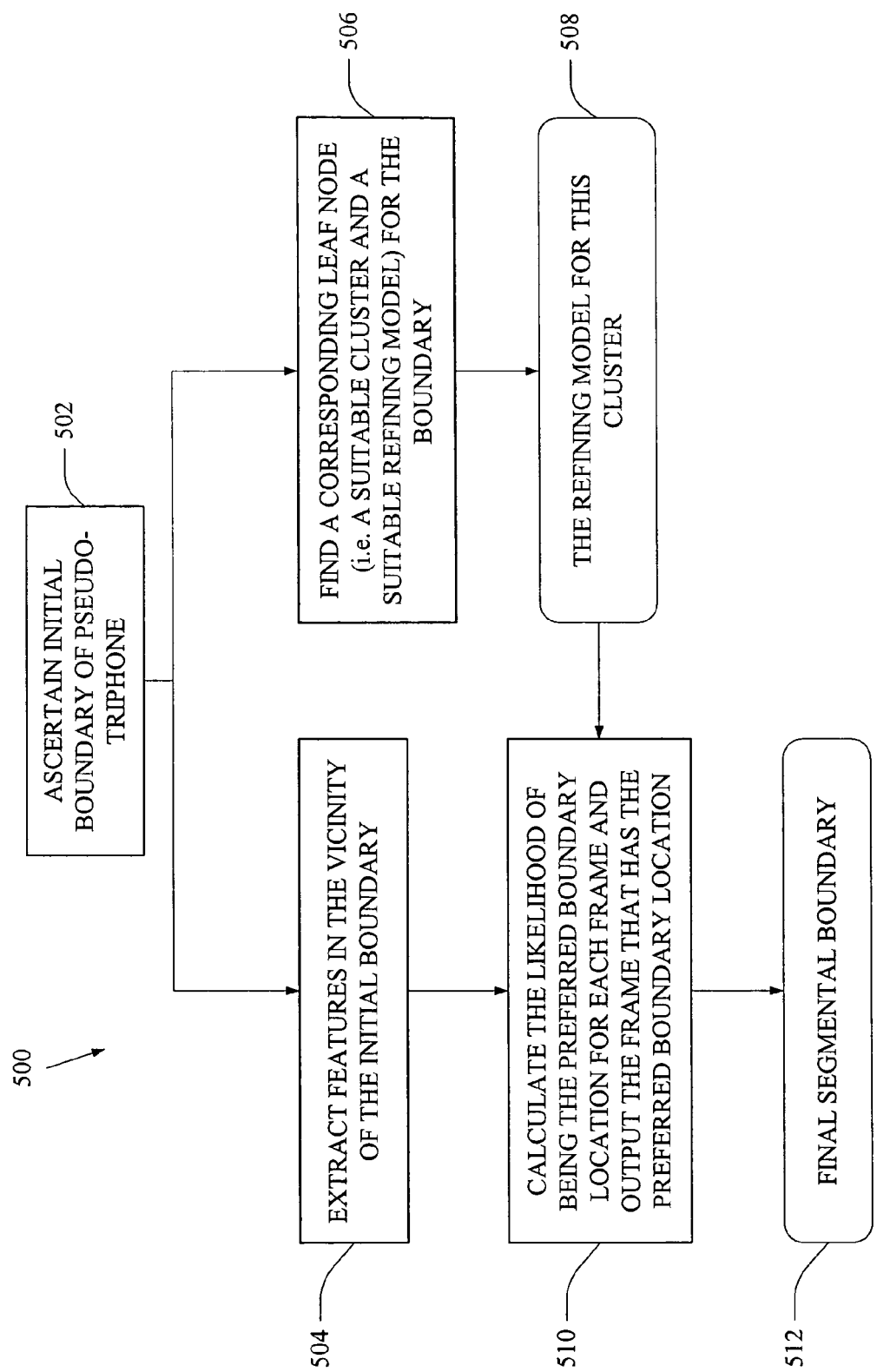
FIG. 5 is flow diagram of a method for automatic boundary segmentation.

FIG. 5 illustrates a method 500 for refining an initial boundary of a pseudo-triphone in corpus 218. At step 502, an initial boundary of a pseudo-triphone is ascertained. Acoustic features are first extracted for frames in the search range at step 504. In the exemplary implementation mentioned above, 141 frames of 195-dimension vectors are extracted. A leaf node on the CART or other cluster is found by querying to its corresponding pseudo-triphone at step 506. As a result, the pre-trained refining model 508 attached to the leaf node or cluster is found from the set of refining models 214. The likelihood for each frame in the search range is the calculated at step 510 using the pre-trained refining model 508 (e.g. a GMM in the illustrative example) and the frame that has the maximum likelihood is outputted as indicated at 512 as the optimal location for the boundary for the pseudo-triphone under consideration. All of boundaries of the pseudo-triphones in the corpus 218 can be refined in this manner to provide a set 224.

In summary, a system and method have been described that provide a post-refining method with fine contextual-dependent refining models for the auto-segmentation task of boundaries of adjacent phoneme speech units. The refining model is trained with a super feature vector extracted from multiple, preferably, evenly spaced frames near the boundary, which is used to describe the waveform evolution across a boundary. A clustering technique such as CART is used to cluster acoustically similar boundaries, so that the refining model for each leaf node is reliably trained with a small amount of limited manually labeled boundaries.

The system and method provides accurate boundaries for phoneme speech units automatically given a small training set of accurately located boundaries and a larger corpus upon which other phoneme speech units can be obtained. For instance, the system of FIG. 2 and the methods of FIGS. 3 and 5 can used to provide customized phoneme speech units for a given speaker. In particular, a speaker can provide a first, relatively small set of training data utterances (e.g. 250 utterances) that is accurately analyzed to locate phoneme speech unit boundaries for corpus 202. A set of refining models 214 can then be obtained as discussed above and applied to a larger corpus 218 from the speaker to automatically obtain phoneme speech unit boundaries in order to quickly develop a corpus of phoneme speech units that can be used in a TTS system designed to emulate the given speaker. The system of FIG. 2 can be implemented as discussed above with the environment of FIG. 1, operating on a single computer, local area network or across a wide area network such as the Internet where component modules and stores are remote from one another.

Although the present invention has been described with reference to particular embodiments, workers skilled in the art will recognize that changes may be made in form and detail without departing from the spirit and scope of the invention.

What is claimed is:

1. A method of ascertaining phoneme speech unit boundaries of adjacent speech units in speech data, the method comprising:
   receiving training data of speech waveforms with known boundary locations of phoneme speech units contained therein;
   processing the speech waveforms to obtain multi-frame acoustic feature pseudo-triphone representations of a plurality of pseudo-triphones in the speech data, each pseudo-triphone comprising a boundary location, a first phoneme speech unit preceding the boundary location and a second phoneme speech unit following the boundary location;
   clustering the multi-frame acoustic feature pseudo-triphone representations as a function of acoustic similarity in a plurality of clusters;
   training a refining model for each cluster;
   receiving a second set of data of speech waveforms with initial boundary locations of adjacent phoneme speech units contained therein;
   identifying pseudo-triphones in the second set of data and corresponding refining models for each of the pseudo-triphones; and
   using the refining model for each corresponding pseudo-triphone for the second set of data to locate a new boundary location different than the initial boundary and provide output indicating the new boundary locations.

2. The method of claim 1 wherein clustering comprises maintaining a minimum number of multi-frame acoustic feature pseudo-triphone representations greater than one in each cluster.

3. The method of claim 1 wherein clustering comprises controlling a number of clusters created.

4. The method of claim 1 wherein clustering comprises using a Classification and Regression Tree clustering technique.

5. The method of claim 1 wherein clustering comprises using a Support Vector Machine (SVM) clustering technique.

6. The method of claim 1 wherein clustering comprises using a Neural network (NN) clustering technique.

7. The method of claim 1 wherein clustering comprises using a vector quantization (VQ) clustering technique.

8. The method of claim 1 wherein processing the speech waveforms to obtain multi-frame acoustic feature pseudo-triphone representations comprises forming a multi-dimensional matrix or vector based on a number of frames of speech waveform data adjacent to the known boundary.

9. The method of claim 8 wherein forming a multi-dimensional matrix or vector comprises reducing the number of dimensions.

10. The method of claim 1 wherein training a refining model for each cluster comprises forming a Gaussian Mixture Model to model the most likely locations of a boundary for each cluster.

11. The method of claim 10 wherein forming a Gaussian Mixture Model to model the most likely locations of a boundary for each cluster comprises obtaining only a single Gaussian component.

12. The method of claim 1 wherein training a refining model for each cluster comprises forming a Neural Network model to model the most likely locations of a boundary for each cluster.

13. The method of claim 1 wherein training a refining model for each cluster comprises forming a Hidden Markov Model to model the most likely locations of a boundary for each cluster.

14. The method of claim 1 wherein training a refining model for each cluster comprises forming a Maximum Likelihood Probability model to model the most likely locations of a boundary for each cluster.

15. A computer-readable storage medium having computer-executable instructions for processing speech data, the computer-readable medium comprising:
   an acoustic feature generator adapted to receive training data of speech waveforms with known boundary locations of phoneme speech units contained therein and generate multi-frame acoustic feature pseudo-triphone representations of a plurality of pseudo-triphones in the training data, each pseudo-triphone comprising a boundary location, a first phoneme speech unit preceding the boundary location and a second phoneme speech unit following the boundary location;
   a clustering module adapted to receive the multi-frame acoustic feature pseudo-triphone representations of the plurality of pseudo-triphones and cluster the representations based on acoustic similarity; and
   a refining module generator adapted to operate on each cluster of representations and generate a statistical model therefor indicative of the location of the boundary for each cluster.

16. The computer-readable storage medium of claim 15 wherein the clustering module comprises Classification and Regression Tree clustering module.

17. The computer-readable storage medium of claim 16 wherein the clustering module is adapted to maintain a minimum number of multi-frame acoustic feature pseudo-triphone representations greater than one in each cluster.

18. The computer-readable storage medium of claim 16 wherein the clustering module is adapted to control a number of clusters created.

19. The computer-readable storage medium of claim 15 wherein the clustering module comprises a Support Vector Machine (SVM) clustering module.

20. The computer-readable storage medium of claim 19 wherein the clustering module is adapted to maintain a minimum number of multi-frame acoustic feature pseudo-triphone representations greater than one in each cluster.

21. The computer-readable storage medium of claim 19 wherein the clustering module is adapted to control a number of clusters created.

22. The computer-readable storage medium of claim 15 wherein the clustering module comprises a Support Vector Machine (SVM) clustering module.

23. The computer-readable storage medium of claim 22 wherein the clustering module is adapted to maintain a minimum number of multi-frame acoustic feature pseudo-triphone representations greater than one in each cluster.

24. The computer-readable storage medium of claim 22 wherein the clustering module is adapted to control a number of clusters created.

25. The computer-readable storage medium of claim 15 wherein the clustering module comprises a vector quantization (VQ) clustering module.

26. The computer-readable storage medium of claim 25 wherein the clustering module is adapted to maintain a minimum number of multi-frame acoustic feature pseudo-triphone representations greater than one in each cluster.

27. The computer-readable storage medium of claim 25 wherein the clustering module is adapted to control a number of clusters created.

28. The computer-readable storage medium of claim 15 wherein acoustic feature generator is adapted to form a multi-dimensional matrix or vector based on a number of frames of speech waveform data adjacent to the known boundary.

29. The computer-readable storage medium of claim 28 wherein the refining module generator is adapted to form a Gaussian Mixture Model to model the most likely locations of a boundary for each cluster.

30. The computer-readable storage medium of claim 29 wherein the refining module generator is adapted to form a Gaussian Mixture Model having only a single Gaussian component to model the most likely locations of a boundary for each cluster.

31. The computer-readable storage medium of claim 15 wherein the refining module generator is adapted to form a Neural Network model to model the most likely locations of a boundary for each cluster.

32. The computer-readable storage medium of claim 15 wherein the refining module generator is adapted to form a Hidden Markov Model to model the most likely locations of a boundary for each cluster.

33. The computer-readable storage medium of claim 15 wherein the refining module generator is adapted to form a Maximum Likelihood Probability model to model the most likely locations of a boundary for each cluster.

34. The computer-readable storage medium of claim 15 and further comprising:

a boundary segmentation module adapted to receive the statistical model for each cluster of representations and a second set of data of speech waveforms with initial boundary locations of adjacent phoneme speech units contained therein and using the statistical models obtain new boundary locations for the adjacent phoneme speech units.

\* \* \* \* \*